(12) United States Patent
Karlinger

(10) Patent No.: US 6,811,124 B2
(45) Date of Patent: Nov. 2, 2004

(54) DEVICE FOR GUIDING A HOSE

(75) Inventor: Stefan Karlinger, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 29 days.

(21) Appl. No.: 10/446,350

(22) Filed: May 28, 2003

(65) Prior Publication Data

US 2003/0226940 A1 Dec. 11, 2003

(30) Foreign Application Priority Data

Jun. 5, 2002 (DE) .......................................... 102 24 858

(51) Int. Cl.⁷ .................................................. F16L 3/00
(52) U.S. Cl. ........................ 248/49; 74/490.02; 248/79
(58) Field of Search ........................ 74/490.02; 248/79, 248/75, 49, 53, 74.1; 414/8; 134/21

(56) References Cited

U.S. PATENT DOCUMENTS

| | | | | |
|---|---|---|---|---|
| 5,007,605 A | * | 4/1991 | Horvath ....................... | 248/62 |
| 5,322,480 A | | 6/1994 | Meier et al. ................. | 474/145 |
| 5,329,824 A | * | 7/1994 | Carapezza et al. ........... | 73/866.5 |
| 6,073,891 A | * | 6/2000 | Humber ....................... | 248/74.5 |
| 6,189,403 B1 | | 2/2001 | Berninger | |

FOREIGN PATENT DOCUMENTS

| | | | |
|---|---|---|---|
| DE | 36 19 399 A1 | 12/1987 | |
| DE | 94 06 405 U | 8/1995 | |
| DE | 197 28 224 C1 | 11/1998 | |
| DE | 201 12 491 U | 10/2001 | |
| DE | 699 02 351 T2 | 11/2002 | |
| EP | 0 544 027 A1 | 6/1993 | |
| EP | 0 581 162 A | 2/1994 | |
| EP | 0 891 842 A | 1/1999 | |
| EP | 0 950 477 A | 10/1999 | |
| EP | 1 145 808 A | 10/2001 | |
| FR | 2 778 449 A | 11/1999 | |
| FR | 2 814 290 A | 3/2002 | |
| JP | 4-347085 | * 12/1992 | .................. 248/49 |
| WO | WO 01 59900 A | 8/2001 | |

OTHER PUBLICATIONS

Patent application No. 2001/0042813 A1 to Taylor, Publication Date Nov. 22, 2001.*

* cited by examiner

Primary Examiner—Ramon O Ramirez
(74) Attorney, Agent, or Firm—McGlew and Tuttle, P.C.

(57) ABSTRACT

A compact, simple design of a device for guiding a hose, in which the device has a channel with a lateral, longitudinal opening.

30 Claims, 5 Drawing Sheets

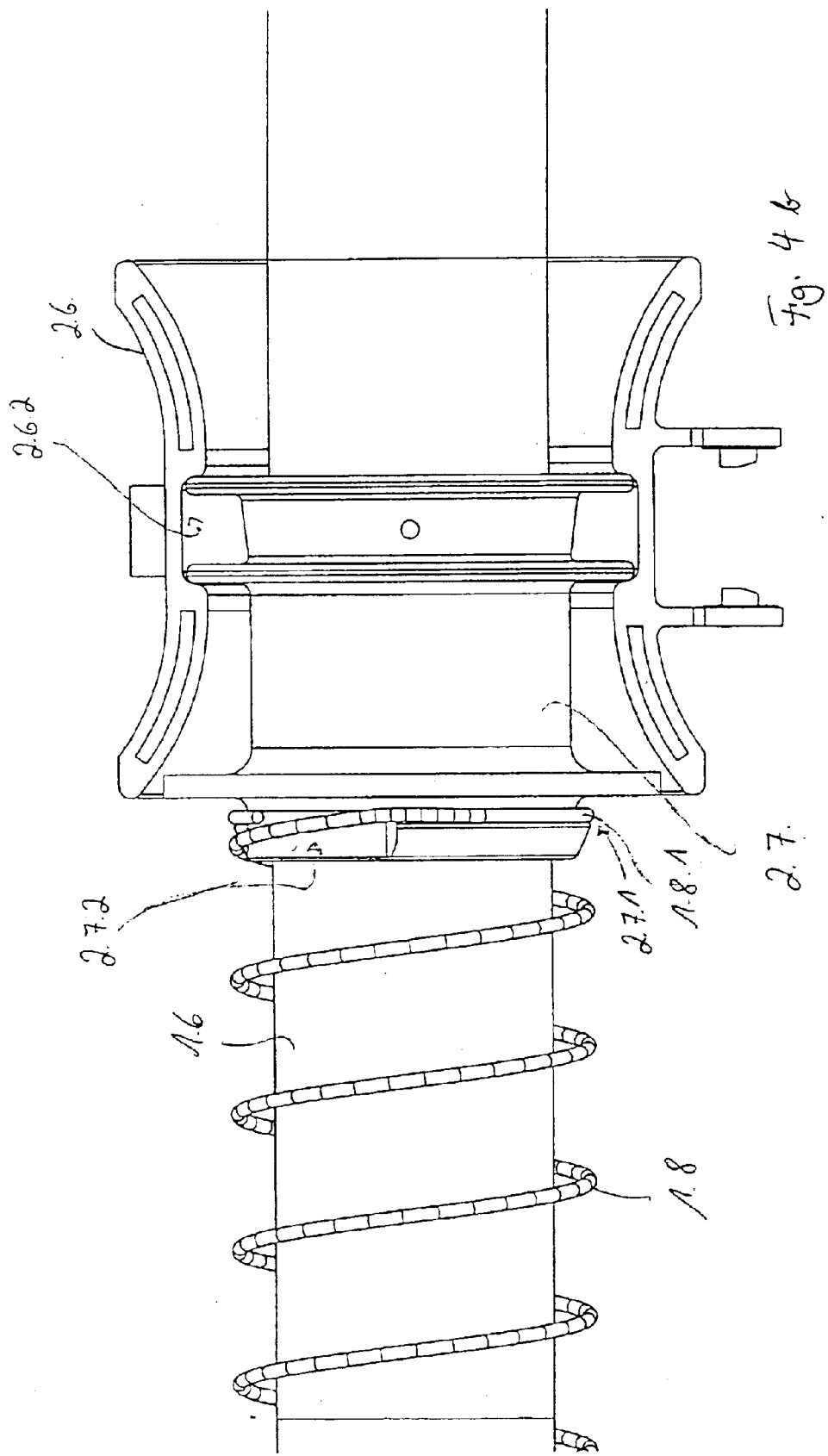

DEVICE FOR GUIDING A HOSE

FIELD OF THE INVENTION

The invention relates to a device for guiding at least one hose.

BACKGROUND OF THE INVENTION

Such hose guiding devices are provided in the case of machines, installations and in particular robots for the purpose of guiding a protective hose carrying supply lines, such as energy and control cables, fluids such as cooling liquids or gaseous fluids for producing an overpressure and an underpressure. This constitutes the preferred field of application of the invention.

In the case of a robot, such hoses are e.g. carried along parts of the robot, such as along the robot arm, and along the rocker arm. As a result of movements of the robot, particularly also the robot hand, which generally carries a tool supplied by the supply line, the supply lines and protective hose must be able to perform length compensating movements. Normally the protective hose is surrounded by a helicoidal tension spring, which is on the one hand located on an abutment on the protective hose and on the other on a robot fixed part. Guidance takes place either by means of a separate slide or several bearing points constructed in socket-like manner and in which or along which the protective hose can slide.

A disadvantage of such guidance devices is the fact that the slide guides are complicated and the multiple bearings are imprecise, i.e. they enable the guide hose and therefore the supply lines to effect relatively large deflection movements and consequently there is a damage risk for both the hose and the supply line. In addition, both constructions are expensive and bulky.

Therefore the problem of the invention is to provide a device for guiding and longitudinally compensating a hose in a compact, simple form, which permits a precise guidance and return of the hose to a small space.

SUMMARY OF THE INVENTION

According to the invention the set problem is solved by a device for guiding a hose in that it is provided with a channel having a lateral longitudinal opening.

According to a preferred development, the longitudinal opening width is smaller than the transverse dimension of the hose guided in the channel or the width of the lateral opening of the channel is smaller than the dimension of a tension spring surrounding the hose, but the opening width is such that it exceeds the transverse dimension of the supply lines guided by the protective hose and preferably to a significant extent, so as to prevent a bending round of the supply lines. Fundamentally the channel can have a random cross-section and can e.g. also be oval-shaped, if several hoses are to be guided in parallel. However, preferably, the channel has a circular cross-section.

In order to avoid the risk of damage to the supply lines led laterally out of the lateral longitudinal opening and/or a protective hose surrounding the same in this area and which is consequently led laterally out of the channel (provided that it is surrounded by a spring, so that it is not forced out of the channel in the spring-surrounding area), the invention also provides for the channel having, in the vicinity of its longitudinal opening, laterally extending, longitudinal shoulders, which in particular in the vicinity of their free longitudinal edges have a larger relative spacing than in the transition area thereof to the channel.

If the protective hose is provided with a spring for exerting a bias counter to the movement of the part to which the supply line leads, according to a preferred development an abutment for a spring surrounding the hose is connected to the channel and in particular the abutment is constructed as a circumferential groove in which engages one end of the spring. The spring is provided with a further abutment at a tool-remote area of the protective hose, e.g. in that a wearing ring is fitted there.

On the channel side facing the tool is preferably provided a trumpet-shaped holder or passage for the hose, which in an extremely preferred development is constructed as a swing-up clamping collar, so that when the latter is swung up the hose can be inserted laterally therein and is completely surrounded by the same after closure.

BRIEF DESCRIPTION OF THE DRAWINGS

Further advantages and features of the invention can be gathered from the claims and the following description of an embodiment of the invention with reference to the attached drawings, wherein show:

DETAILED DESCRIPTION OF THE DRAWINGS

Figure 1:
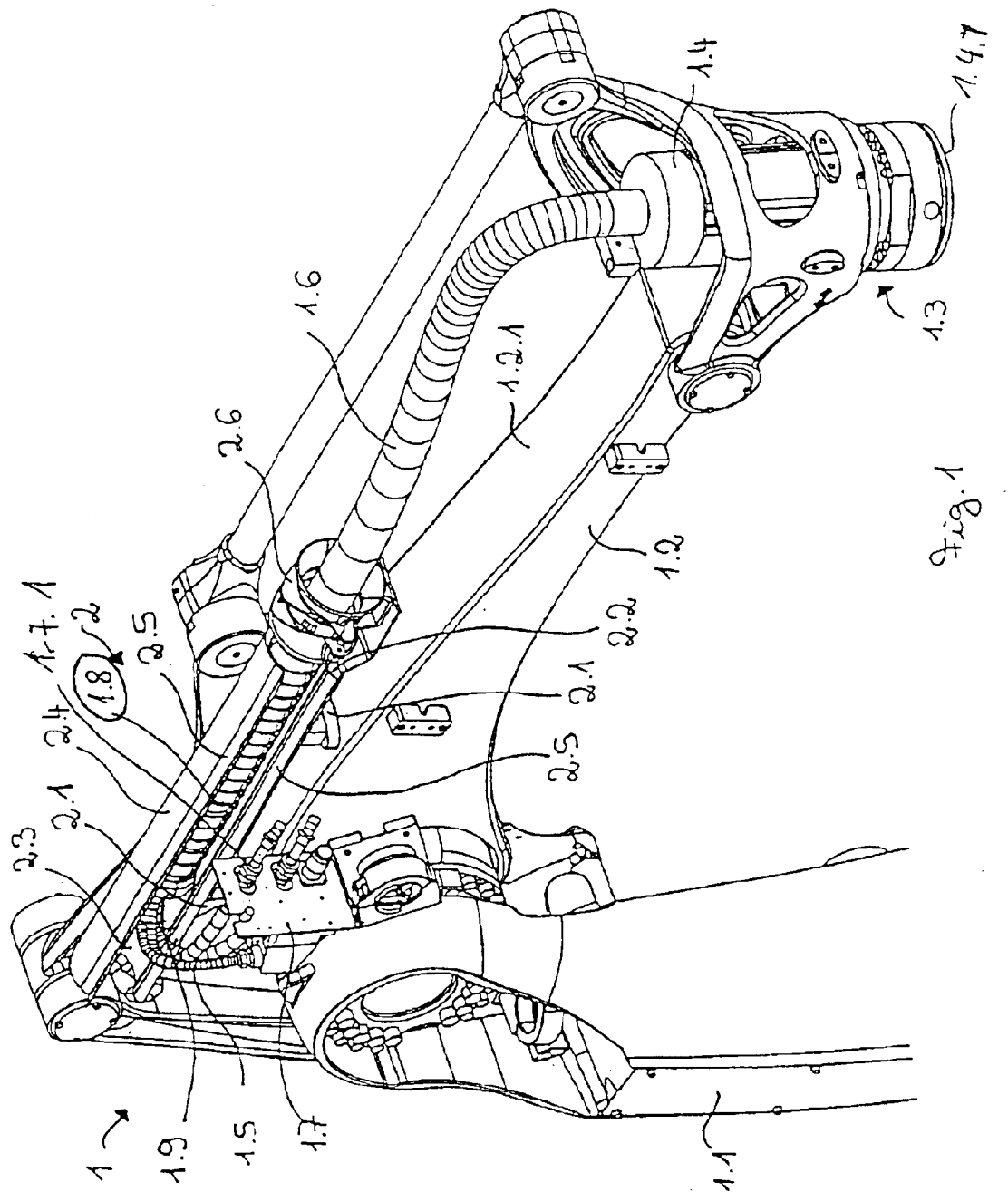
FIG. 1 A device for guiding a hose located on a partly shown robot.
Figure 2:
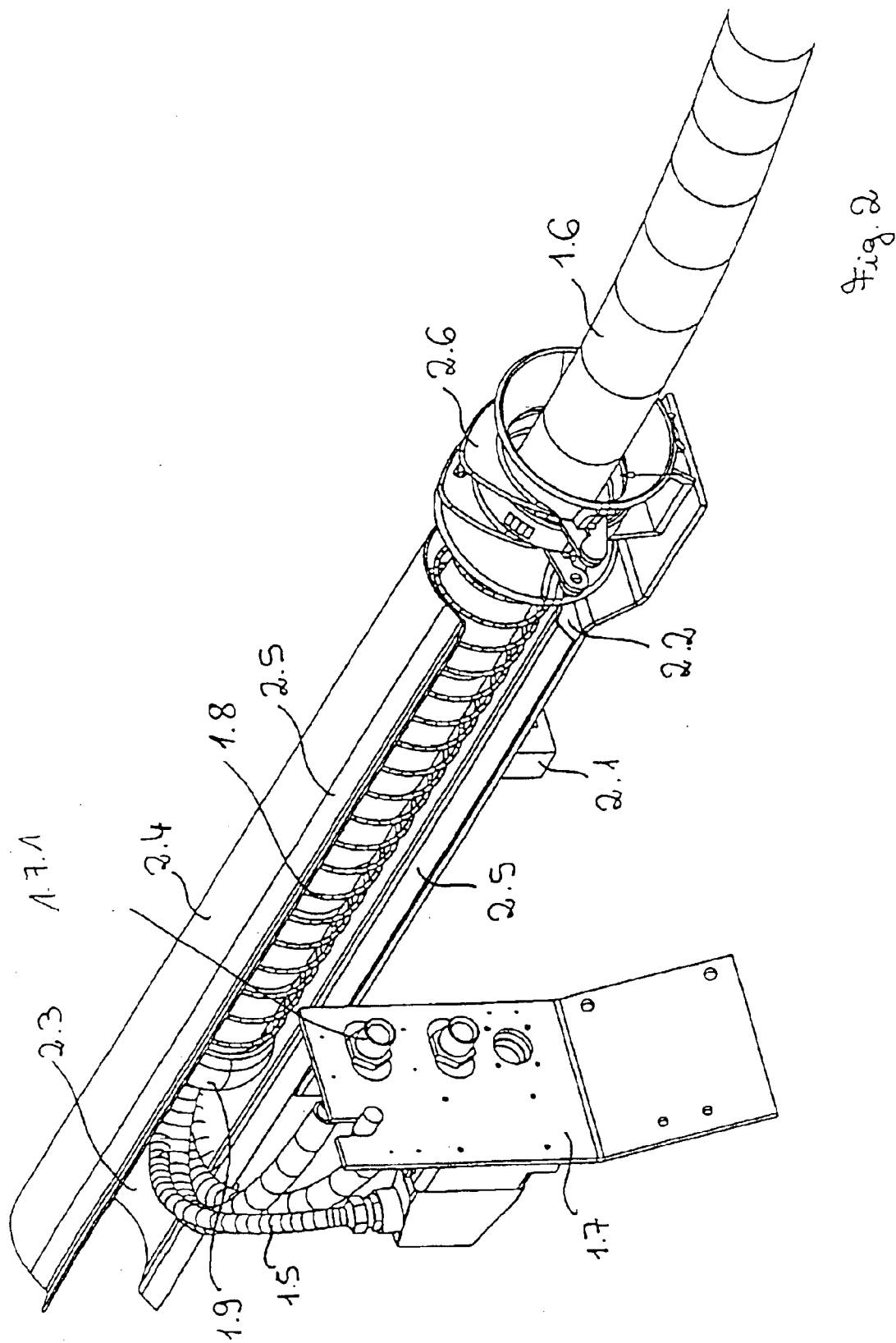
FIG. 2 A larger-scale view of the inventive device for guiding a hose with a protective hose for a cable located therein.
Figure 3:
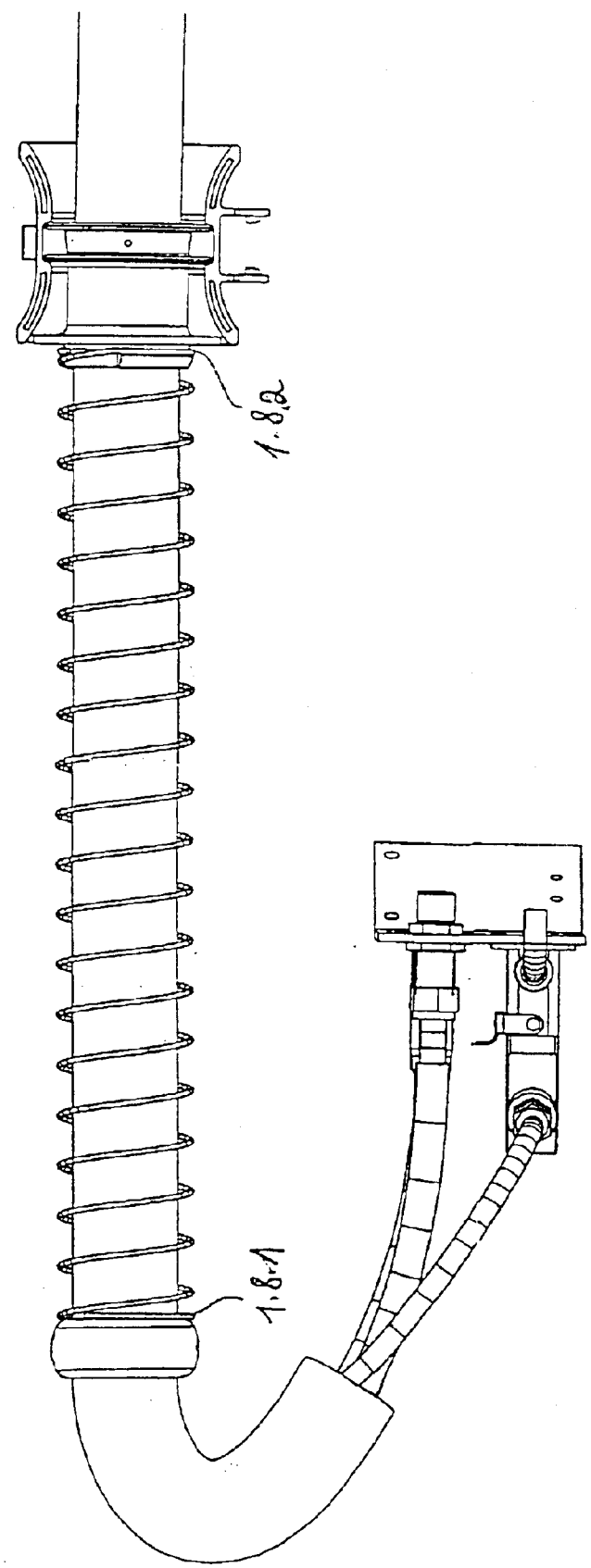
FIG. 3 A section through the channel of the inventive device for guiding the hose with the hose inserted.

FIG. 1 shows parts of a robot 1, namely a rocker arm 1.1, a robot arm 1.2 and a robot hand 1.3. In the embodiment shown the latter carries a motor with a hollow axis for the last hand axis and a tool can be fitted to the flange 1.4.1. Alternatively the hand 1.3 could directly hold a tool. The supply of the motor 1.4 or a tool, such as an electric power supply, supply with media, such as cooling media, but also a "supply" with underpressure, i.e. the exertion of an underpressure by suction cups provided on a tool 1.4, takes place by means of supply lines 1.5 carried in a protective hose 1.6. At the end thereof remote from the motor 1.4 the supply lines 1.5 issue into a connection plate 1.7, which is secured on the robot arm 1.2 and has connections 1.7.1 for connection to supply lines carried along the rocker arm 1.1 to the not shown base of the robot 1.

The partly shown robot is a palletizing robot. The invention is also usable in the case of other, conventional industrial robots.

On the top 1.2.1 of the robot arm 1.2 is provided a device 2 for guiding the hose 1.6. The latter is provided with two webs 2.1 fixed to the top 1.2.1 of the robot arm 1.2 and which carry a mounting plate 2.2, on which is held a channel 2.4 provided with a lateral, longitudinal opening 2.3. On its edges bounding the openings, the channel 2.4 is provided with lateral, longitudinal shoulders, which widen to the outside, i.e. have a greater relative spacing at their free outer edge than at the transition area to the channel 2.4.

The protective hose 1.6 is surrounded by a helicoidal tension spring 1.8. At its free, rear end remote from the tool 1.4 it is provided with a wearing ring 1.9 on which the tension spring 1.8 has one of its abutments.

A trumpet-like clamping collar 2.6 is connected to the mounting plate 2.2 at the front end thereof and through said collar the protective hose 1.6 is passed out to the tool 1.4 of channel 2.4. On said clamping collar 2.6 is constructed a fixed abutment for the tension spring 1.8, e.g. in the form of annular groove in which engages the end of the spring 1.8 facing the clamping collar 2.6 and which is consequently laterally retained.

If the robot hand 1.3 with the tool 1.4, moves e.g. with its underside towards the rocker arm 1.1, it draws the protective hose 1.6 and supply line 1.5 after it counter to the action of the tension spring 1.8, whereas in the opposite movement of robot hand 1.3 and tool 1.4 the protective hose 1.6 and supply line 1.5 are released and consequently the end of the hose 1.6 remote form the robot hand 1.3, under the action of the tension spring 1.8, can be moved further towards the rear of the device 2. The same applies on pivoting the robot hand 1.3 and/or the tool 1.4 about the axis of symmetry of tool 1.4/robot hand 1.3.

During the aforementioned movements the supply lines follow the protective hose end and modify their radius of curvature between the outlet from the protective hose 1.6 and the connection plate 1.7. On relieving, the supply lines 1.5 move back with the end of the protective hose 1.6 and reassume their original curvature.

Figure 4A:
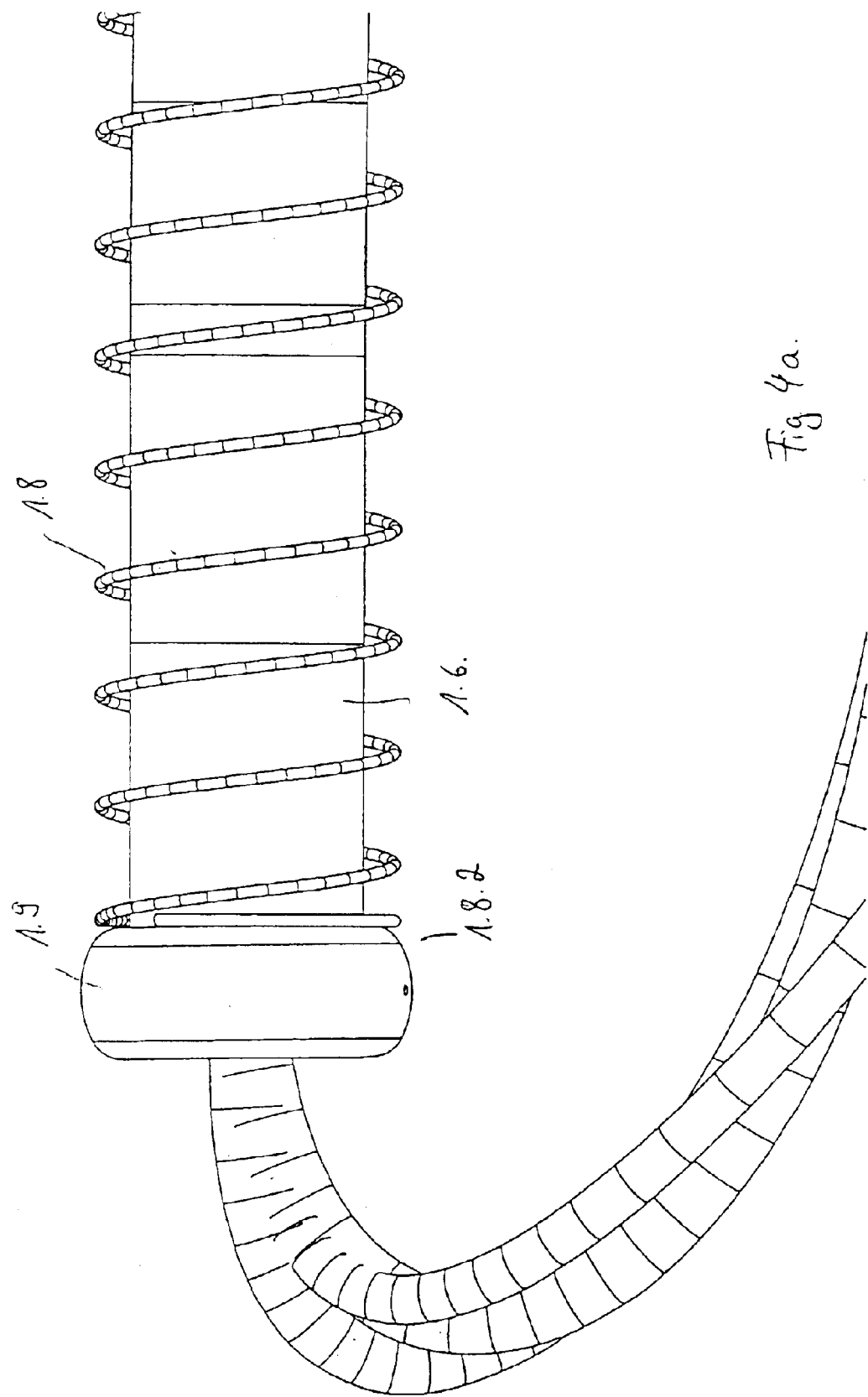
FIGS. 4a/4b Detail views of the end and attachment areas of the tension spring of FIGS. 1 to 3.

As can in particular be gathered from FIGS. 4*a* and 4*b*, the last, terminal coil or turn 1.8.1, 1.8.2 of the tension spring 1.8 is in each case formed in an axially vertical plane, so that the end coil 1.8.1 engages in almost solid ring-like manner on the wearing ring 1.9. The opposite end turn 1.8.2 of the tension spring 1.8 is located in an annular groove 2.7.1 of an insert part 2.7 of the clamping collar 2.6 into which the tension spring 1.8 passes by menas of a recess 2.7.2 and in which is locked the end turn 1.8.2. Following the closing of the clamping collar 2.6 the insert part 2.7 is at least axially positively held in the central area 2.6.1 of said collar 2.6.

The invention creates a compact device for guiding a hose, such as in this case a protective hose for the supply lines of a robot in the form of a single unit permitting a precise guidance of the hose and the return in the case of limited space requirements.

| REFERENCE NUMERALS LIST | |
|---|---|
| 1 | Robot |
| 1.1 | Rocker arm |
| 1.2 | Robot arm |
| 1.2.1 | Top of the robot arm |
| 1.3 | Robot hand |
| 1.4 | Tool |
| 1.5 | Supply lines |
| 1.6 | Protective hose |
| 1.7 | Connection plate |
| 1.7.1 | Connections |
| 1.8 | Tension spring |
| 1.8.1/1.8.2 | End coil (of 1.8) |
| 1.9 | Wearing ring |
| 2 | Hose guidance device |
| 2.1 | Webs |
| 2.2 | Mounting plate |
| 2.3 | Longitudinal opening |
| 2.4 | Channel |
| 2.5 | Longitudinal shoulders |
| 2.6 | Clamping collar |
| 2.6.1 | Central area (of 2.6) |
| 2.7 | Insert part |
| 2.7.1 | Annular groove |
| 2.7.2 | Recess |

What is claimed is:

1. A device for guiding at least one hose, having a channel with a lateral, longitudinal opening, a tension spring adapted to surround the hose, and an abutment connecting the spring to the channel.

2. The device according to claim 1, wherein the width of the longitudinal opening is smaller than the transverse dimension of the hose guided in the channel.

3. The device according to claim 1, wherein the width of the lateral opening of the channel is smaller than the dimension of a tension spring surrounding the hose.

4. The device according to claim 1, wherein the channel has a circular cross-section.

5. The device according to claim 1, wherein, in the vicinity of its longitudinal opening, the channel is provided with laterally extending, longitudinal shoulders.

6. The device according to claim 5, wherein the longitudinal shoulders, in the vicinity of their free longitudinal edges, have a greater relative spacing than in their transition area to the channel.

7. The device according to claim 1, wherein the abutment is constructed as a circumferential groove in which engages one end of the spring.

8. The device according to claim 7, wherein there is a trumpet-shaped holder for the hose.

9. The device according to claim 8, wherein the holder is constructed as a swing-up clamping collar.

10. The device according to claim 9, wherein the channel/ or the holder and a holding rail are fixed by webs.

11. A device for guiding at least one hose, having a channel with a lateral, longitudinal opening, in the vicinity of the longitudinal opening, the channel is provided with laterally extending longitudinal shoulders, the longitudinal shoulders in a vicinity of their free longitudinal edges, have a greater relative spacing than in their transition area to the channel.

12. The device according to claim 11, wherein the width of the longitudinal opening is smaller than the transverse dimension of the hose guided in the channel.

13. The device according to claim 11, wherein the hose is surrounded by a tension spring.

14. The device according to claim 13, wherein the width of the lateral opening of the channel is smaller than the dimension of a tension spring surrounding the hose.

15. The device according to claim 11, wherein the channel has a circular cross-section.

16. The device according to claim 11, wherein an abutment for a spring surrounding the hose is connected to the channel.

17. The device according to claim 16, wherein the abutment is constructed as a circumferential groove in which engages one end of the spring.

18. The device according to claim 17, wherein there is a trumpet-shaped holder for the hose.

19. The device according to claim 18, wherein the holder is constructed as a swing-up clamping collar.

20. The device according to claim 19, wherein the channel/or the holder and a holding rail are fixed by webs.

21. A device for guiding a hose, the device comprising:
a channel defining lateral longitudinal opening;
a spring arranged inside said channel and connected to said channel, said spring being able to surround the hose, a lateral width of said lateral longitudinal opening being smaller than a diameter of said spring.

22. The device according to claim 21, wherein the width of the lateral longitudinal opening is smaller than a transverse dimension of the hose guided in the channel.

23. The device according to claim 21, wherein the channel has a circular cross-section.

24. The device according to claim 21, wherein, in the vicinity of its longitudinal opening, the channel is provided with laterally extending, longitudinal shoulders.

25. The device according to claim 24, wherein the longitudinal shoulders in the vicinity of their free longitudinal edges, have a greater relative spacing than in their transition area to the channel.

26. The device according to claim 21, wherein an abutment for said spring surrounding the hose is connected to the channel.

27. The device according to claim 26, wherein the abutment is constructed as a circumferential groove in which engages one end of the spring.

28. The device according to claim 27, wherein there is a trumpet-shaped holder for the hose.

29. The device according to claim 28, wherein the holder is constructed as a swing-up clamping collar.

30. The device according to claim 29, wherein the channel/or the holder and a holding rail are fixed by webs.

* * * * *